Aug. 2, 1960  D. D. CAMPBELL ET AL  2,947,025
HINGE
Filed May 26, 1958  5 Sheets-Sheet 1

INVENTORS
David D. Cambell, &
BY Claud S. Semar

W. S. Pettigrew
ATTORNEY

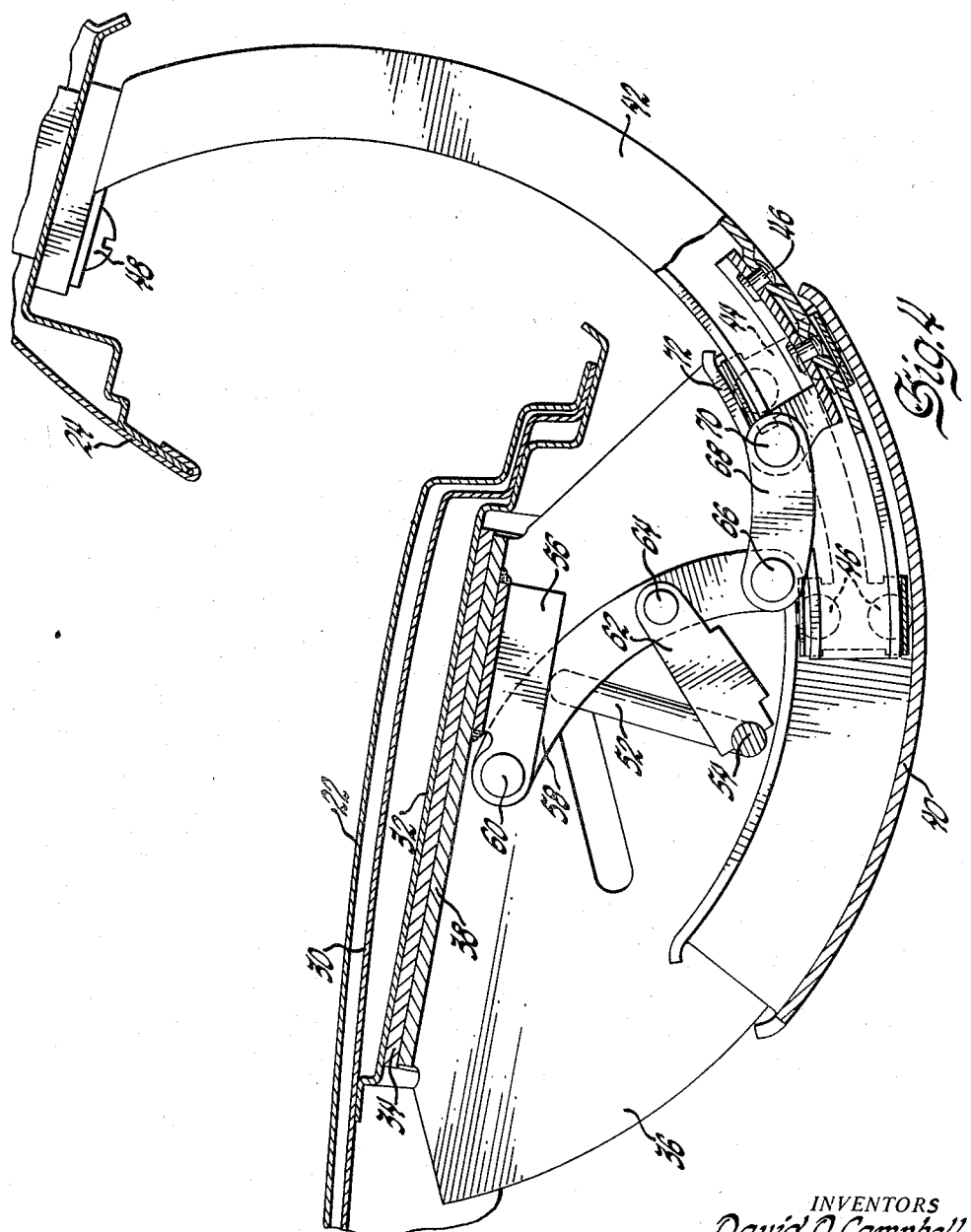

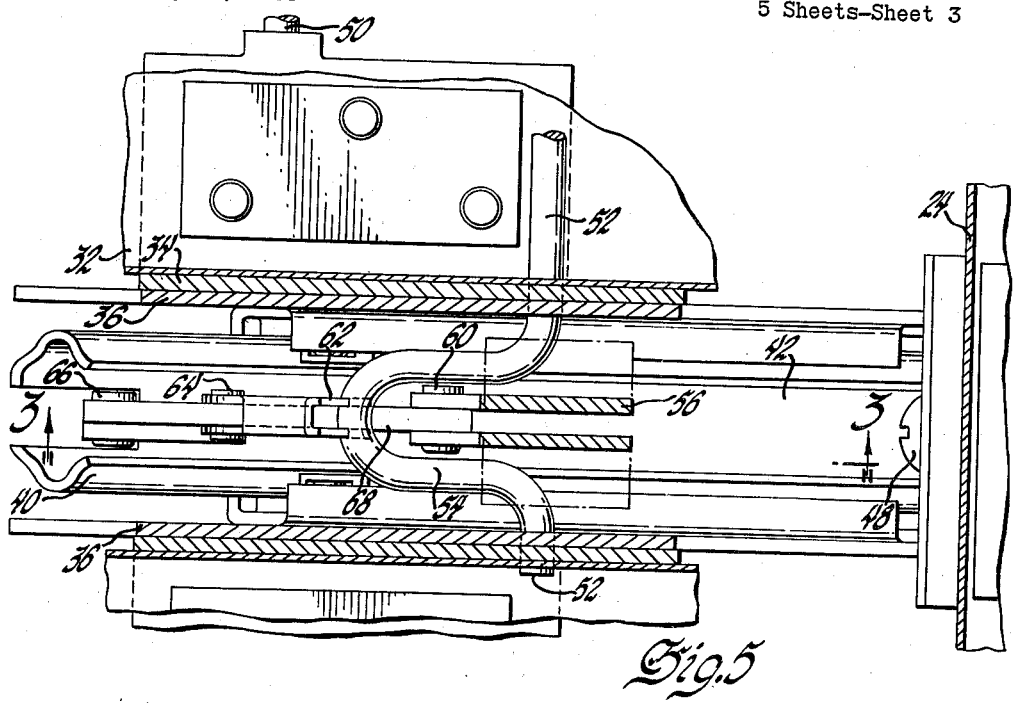
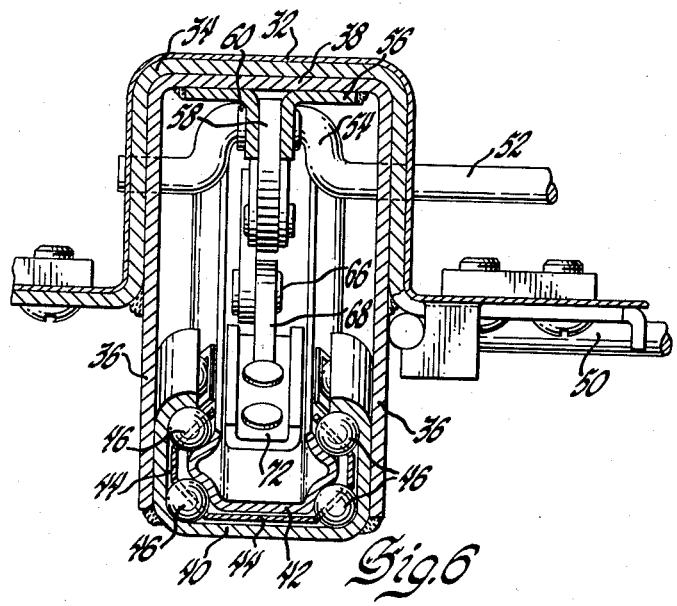

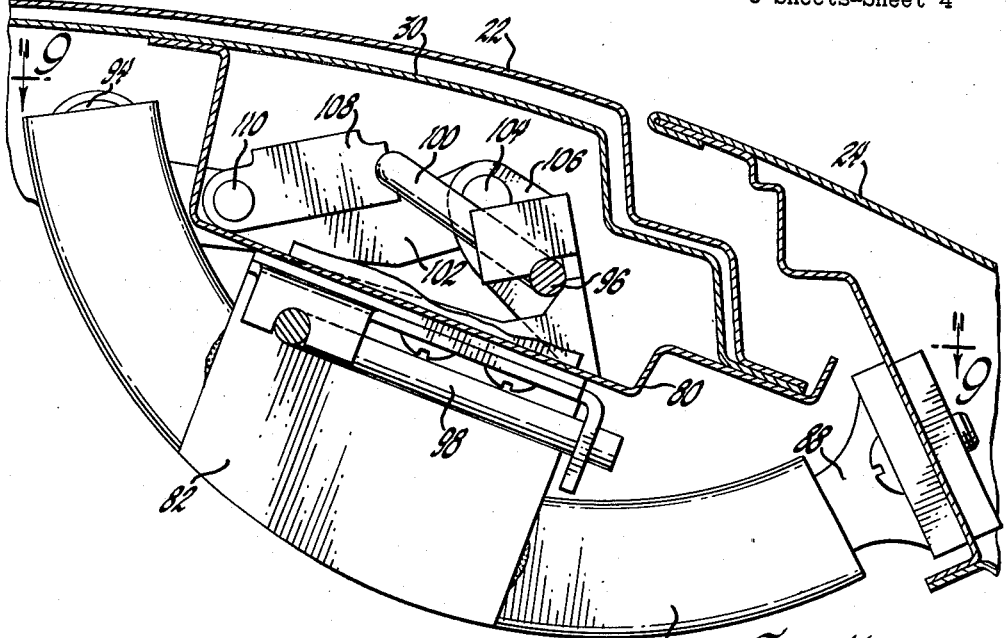
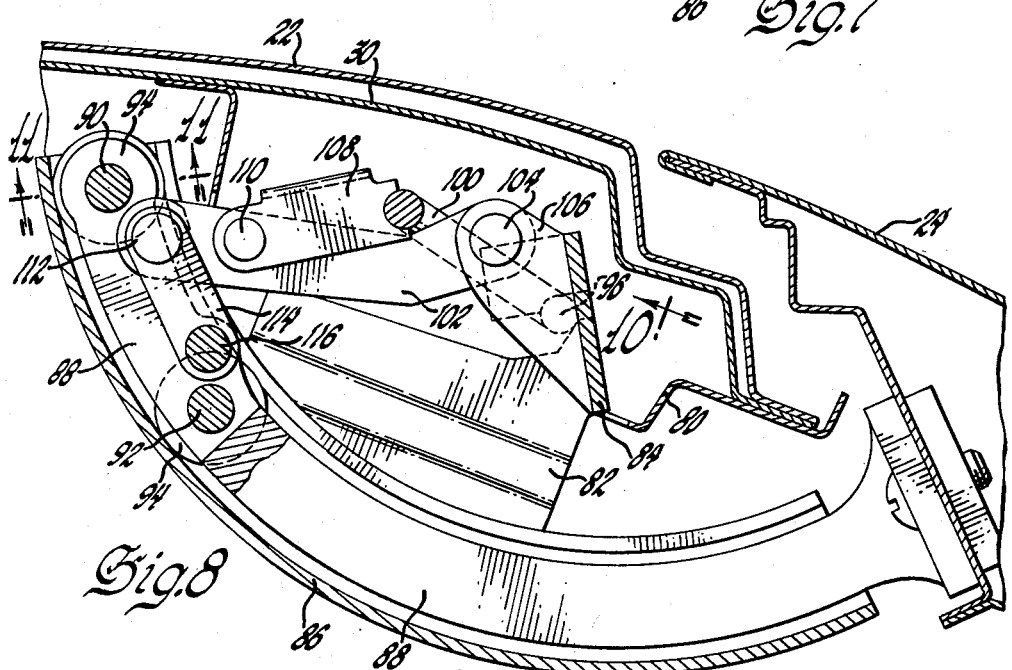

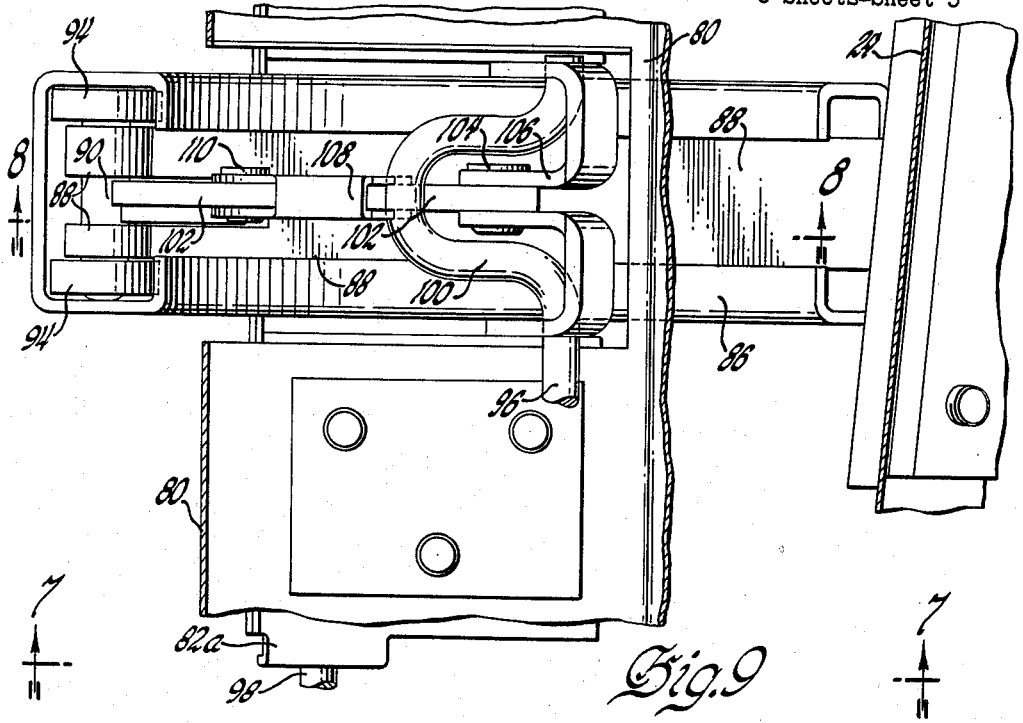
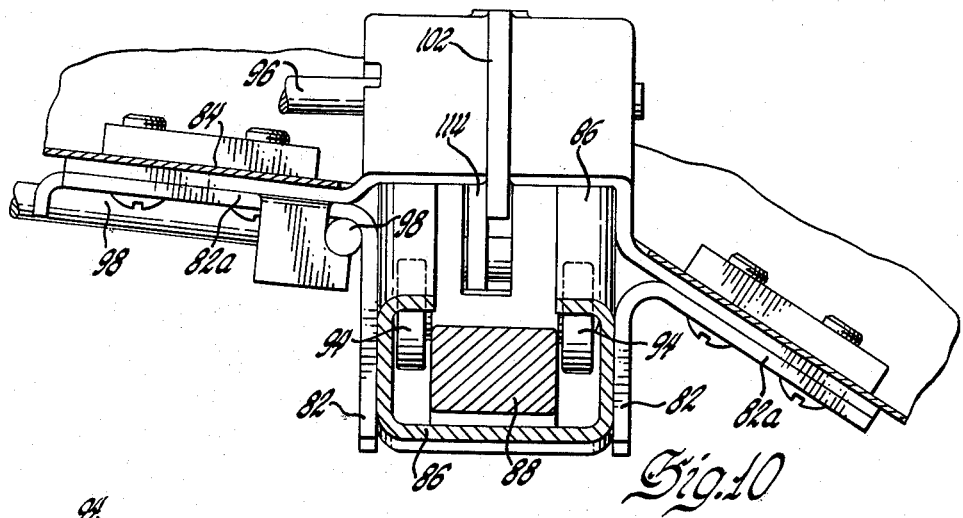
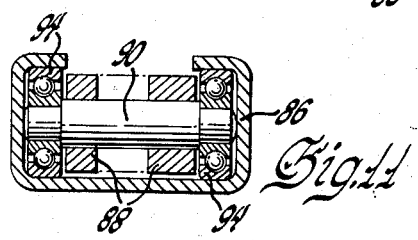

United States Patent Office 2,947,025
Patented Aug. 2, 1960

2,947,025
HINGE

David D. Campbell, Detroit, and Claud S. Semar, Birmingham, Mich., assignors to General Motors Corporation, Detroit, Mich., a corporation of Delaware Filed May 26, 1958, Ser. No. 737,823

4 Claims. (Cl. 16—178)

This invention relates to a hinge for mounting a closure on a body, and more particularly to an arcuate track type hinge for mounting a closure on a vehicle body.

One feature of the invention is that it provides an improved hinge device; another feature of the invention is that it provides a novel arcuate track type hinge for mounting a closure on a vehicle body; a further feature of the invention is that the hinge comprises a first arcuate track member fixedly mounted on the body and a second arcuate track member movably mounted on the first track member and connected to the closure; still another feature of the invention is that the track members are arcuate about the same center and are telescopically arranged one within the other; and still a further feature of the invention is that means are provided for providing a counter-balance force, including a torsion spring and a linkage system connecting the torsion spring to one of the telescopically mounted track members.

Other features and advantages of the invention will be apparent from the following description and from the drawings, in which:

Fig. 4 is a view similar to Fig. 3 but showing the lift gate in open position;

Fig. 5 is a horizontal section taken along the line 5—5 of Fig. 3;

Fig. 6 is a vertical section taken along the line 6—6 of Fig. 3;

Fig. 7 is a view similar to Fig. 3 but showing a modified form of the invention and taken along the line 7—7 of Fig. 9;

Fig. 8 is a vertical section taken along the line 8—8 of Fig. 9;

Fig. 9 is a generally horizontal section taken along the line 9—9 of Fig. 7;

Fig. 10 is a vertical section taken along the line 10—10 of Fig. 8; and

Fig. 11 is a detail section through the hinge device taken along the line 11—11 of Fig. 8.

Figure 1:
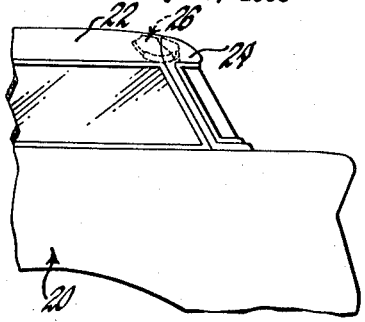
Fig. 1 is a fragmentary side elevational view of a station wagon having the novel hinge mounting the lift gate thereon.
Figure 2:
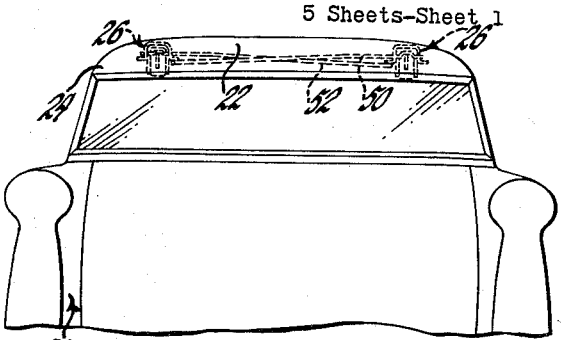
Fig. 2 is a fragmentary rear elevational view of the station wagon.

Referring now more particularly to the drawings, the station wagon shown in Figs. 1 and 2 has a body designated generally as 20 with a roof 22 and a rear opening between the roof and the body in which is swingably mounted a lift gate 24. Adjacent each side of the body there is a hinge device 26 for mounting the lift gate. Inasmuch as these hinge devices are identical except for being of opposite hand, only one will be described in detail.

Figure 3:
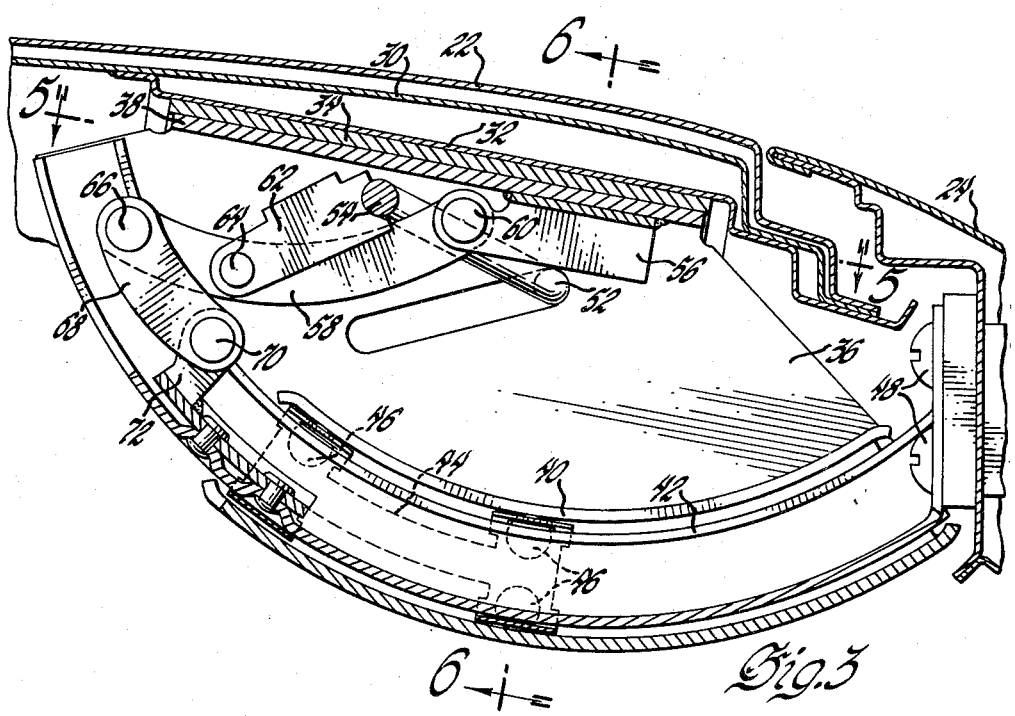
Fig. 3 is an enlarged vertical longitudinal section through the rear portion of the station wagon roof and lift gate showing one of the hinge devices and taken along the line 3—3 of Fig. 5.

As shown in Figs. 3 and 4, the roof structure of the station wagon includes an interior panel 30 to which is welded a support bracket 32 carrying on its lower surface a reinforcing place 34. The hinge structure includes an inverted channel-shaped hinge box having opposite side walls 36 joined by a top web 38. As shown in Fig. 6, the side walls are welded to the reinforcing plate 34 and project up into a recess formed in said plate and in the bracket 32.

An outer channel-shaped arcuate track member 40 is welded to the opposite hinge box walls 36 so that this track member is fixedly mounted on the station wagon body. As shown in Figs. 3 and 4, this track extends longitudinally within the station wagon body and terminates at its rear end adjacent the opening in which the lift gate 24 is to be mounted. An inner arcuate track member 42 is telescopically mounted within the outer track 40. The inner track is arcuate about the same center as the outer track 40 and slidably telescopes with relation to the outer track, the slidable telescoping movement being facilitated by anti-friction means mounted between the track members and comprising a ball cage 44 mounting a plurality of ball bearings 46. At its free end the inner track member 42 mounts the lift gate 24 by means of bolts 48.

In order to provide a counterbalance force for the lift gate 24, there is a torsion bar connected by a linkage system to the inner track member 42. As shown in Fig. 2, a torsion bar 50 has one end anchored to the hinge box at the left side of the station wagon body and the other end journaled in the walls of the hinge box at the right side of the body and formed with a crank portion within the hinge box. There is a similar torsion bar 52 having one end anchored to the hinge box at the right side of the body and the other end journaled in the hinge box at the left side of the body and formed with a crank within the hinge box.

Referring to Figs. 3–6 which illustrate the hinge box at the left side of the body, the crank portion of the torsion bar 52 is shown at 54. A support bracket 56 is welded to the lower surface of the hinge box web 38 and depends therefrom, and at the forward end of this support bracket one end of a first link 58 is pivotally connected by a pin 60. A second link 62 has one end formed with a notch engaging the crank portion 54 of the torsion bar 52 and the other end articulated at 64 to the link 58 intermediate the ends thereof. The forward end of the link 58 is connected by a pin 66 to a third link 68 which, at its lower end, is connected by a pin 70 to an upstanding bracket 72 welded to the forward end of the inner track member 42. The torque rod 52 is anchored to the other hinge box and is twisted when mounted in such a manner that it applies a counterbalance force opposing the weight of the lift gate.

The lift gate may be moved between the closed position of Fig. 3 and the open position of Fig. 4. During this movement the inner track member 42 moves telescopically with reference to the outer track member 44. The hinge uses only a small amount of headroom below the roof 22 as compared with swinging gooseneck type hinges which have been used in the past. Furthermore, the telescopic movement of the two track members results in bodily movement of the lift gate up and above the roof as shown in Fig. 4, thus getting the lift gate out of the way when in its open position to facilitate access to the rear end of the station wagon body.

Figs. 7–11 show a modified form of the invention in which the shape and arrangement of the hinge box is changed and in which there is a different type of anti-friction means between the two channels. In this modified form of the invention there is a support bracket 80 depending from the inner roof panel 30 and housing the links which connect the torsion rod to the hinge member. The hinge box itself is smaller than in the embodiment of the invention shown in Figs. 3–6 and comprises opposite wall members 82 having a connecting web 84. As shown in Fig. 10, the hinge box walls 82 have flanges 82a at their opposite sides which are bolted to the bracket 84. A channel-shaped arcuate outer track 86 is mounted between the side walls 82 of the hinge box and an arcuate inner track 88 is telescopically carried within the track 86. The free rear end of the inner track 88 is bolted to the lift gate 24. Anti-friction means are mounted between the two track members to facilitate movement therebetween. As shown in Figs. 8 and 11, a pair of pins 90 and 92 extend in spaced relation transversely through the inner track member 88 and bearings 94 on opposite ends of each pin seat in the outer track, engaging the lower web and upper bent flanges on this track.

As in the modification of Figs. 3–6, there are transverse torsion rods 96 and 98 connected between the hinge boxes at opposite sides of the automobile body, each torsion rod being anchored at one end to one hinge box and being journaled in the other hinge box and having a crank portion, as the crank 100 formed in the last-mentioned hinge box. A first link 102 is pivoted on a stud 104 carried on a mounting bracket 106 projecting from the base of the hinge box and a second link 108 is pivoted at 110 on the first link 102 intermediate the ends thereof and is formed at its end with a notch engaging the crank portion 100 of the torque rod 96. The other end of the first link is pivoted at 112 to a third link 114 which is connected at 116 to the inner track member 88 to provide a counterbalance force for the lift gate.

While we have shown and described two embodiments of our invention, it is capable of many modifications. Changes, therefore, in the construction and arrangement may be made without departing from the spirit and scope of the invention as set forth in the appended claims.

We claim:

1. A hinge for mounting a closure on a body, comprising, a first arcuate track member fixedly mounted on the body; a second arcuate track member movably carried on said first track member and connected to the closure, said second track member being arcuate about the same center as the first track member, and one track member being carried within the other; anti-friction means mounted between said track members to facilitate movement therebetween; and means providing a counterbalance force for said closure, including a torsion spring having one end anchored on said body and a crank portion near its other end, a first link pivoted at one end on the body, a second link having one end connected to the crank and the other end articulated to said first link intermediate the ends thereof, and a third link connected between the other end of said first link and said second member.

2. A hinge for mounting a closure on a body, comprising, an outer arcuate track member fixedly mounted on the body; an inner arcuate track member telescopically carried on said outer track member and connected to the closure, said inner track member being arcuate about the same center as the outer track member; anti-friction means mounted between said track members to facilitate movement therebetween; and means providing a counterbalance force for said closure, including a torsion bar having one end anchored on said body and a crank portion near its other end, a first link pivoted at one end on the body, a second link having one end connected to the crank and the other end articulated to said first link intermediate the ends thereof, and a third link connected between the other end of said first link and said inner track member.

3. In an automobile having a body with an opening and a closure member therefor, a hinge device adjacent each side of the body for mounting the closure member on the body, each hinge device comprising a first arcuate track member fixedly mounted on the body; a second arcuate track member movably carried on said first track member and connected to the closure, said second track member being arcuate about the same center as the first track member, and one track member being carried within the other; anti-friction means mounted between said track members to facilitate movement therebetween; and means providing a counterbalance force for said closure including a torsion bar extending between said hinge devices and having one end anchored on one hinge device and the other end formed with a crank portion adjacent the other hinge device, a first link pivoted at one end on the body, a second link having one end connected to the crank and the other end articulated to said first link intermediate the ends thereof, and a third link connected between the other end of said first link and said second track member.

4. In a station wagon having a body with a lift gate, a hinge device adjacent each side of the body for mounting the lift gate on the body, each hinge device comprising an outer arcuate track member fixedly mounted on the body; an inner arcuate track member telescopically carried on said outer track member and connected to the lift gate, said inner track member being arcuate about the same center as the outer track member; anti-friction means mounted between said track members to facilitate movement therebetween; and means providing a counterbalance force for said lift gate including a torsion bar extending between said hinge devices and having one end anchored on one hinge device and a crank portion adjacent the other end of the bar adjacent the other hinge device, a first link pivoted at one end on the body, a second link having one end connected to the crank and the other end articulated to said first link intermediate the ends thereof, and a third link connected between the other end of said first link and said inner track member.

References Cited in the file of this patent

UNITED STATES PATENTS

| | | |
|---|---|---|
| 629,396 | Schuch | July 25, 1899 |
| 2,160,485 | Obrecht | May 30, 1939 |
| 2,799,891 | Ragsdale | July 23, 1957 |